(12) United States Patent
Cao et al.

(10) Patent No.: US 7,354,679 B2
(45) Date of Patent: Apr. 8, 2008

(54) ION CONDUCTIVE RANDOM COPOLYMERS

(75) Inventors: Shuguang Cao, Mountain View, CA (US); Jian Ping Chen, Palo Alto, CA (US); Thomas Jeanes, Antioch, CA (US); Kie Hyun Nam, Palo Alto, CA (US); David Olmeijer, San Francisco, CA (US); Helen Xu, Sunnyvale, CA (US)

(73) Assignee: Polyfuel, Inc., Mountain View, CA (US)

( * ) Notice: Subject to any disclaimer, the term of this patent is extended or adjusted under 35 U.S.C. 154(b) by 279 days.

(21) Appl. No.: 10/987,178

(22) Filed: Nov. 12, 2004

(65) Prior Publication Data

US 2005/0181256 A1 Aug. 18, 2005

Related U.S. Application Data

(63) Continuation-in-part of application No. 10/438,186, filed on May 13, 2003, now Pat. No. 7,202,001.

(60) Provisional application No. 60/446,395, filed on Feb. 10, 2003, provisional application No. 60/426,540, filed on Nov. 15, 2002, provisional application No. 60/381,136, filed on May 14, 2002.

(51) Int. Cl.
   *H01M 8/10* (2006.01)
   *H01M 6/18* (2006.01)

(52) U.S. Cl. .................. 429/314; 429/33; 429/317; 525/534; 525/535; 525/537

(58) Field of Classification Search ........... 525/534, 525/535, 537; 429/33, 314, 317; 526/287, 526/316, 307.5, 348.1
See application file for complete search history.

(56) References Cited

U.S. PATENT DOCUMENTS

| | | | |
|---|---|---|---|
| 3,113,049 A | 12/1963 | Worsham | |
| 3,134,697 A | 5/1964 | Niedrach | |
| 3,282,875 A | 11/1966 | Connolly et al. | |
| 3,297,484 A | 1/1967 | Niedrach | |
| 3,301,893 A | 1/1967 | Putnam et al. | |
| 3,684,747 A | 8/1972 | Coalson et al. | |
| 3,692,569 A | 9/1972 | Grot | |
| 4,036,714 A | 7/1977 | Spitzer | |
| 4,038,213 A | 7/1977 | McClure et al. | |
| 4,176,215 A | 11/1979 | Molnar et al. | |
| 4,242,421 A | 12/1980 | Kudo et al. | |
| 4,262,063 A | 4/1981 | Kudo et al. | |
| 4,303,551 A | 12/1981 | Vaughan | |
| 4,390,603 A | 6/1983 | Kawana et al. | |
| 4,407,905 A | 10/1983 | Takeuchi et al. | |
| 4,417,969 A | 11/1983 | Ezzell et al. | |
| 4,419,486 A | 12/1983 | Rose | |
| 4,453,991 A | 6/1984 | Grot | |
| 4,478,917 A | 10/1984 | Fujita et al. | |
| 4,537,840 A | 8/1985 | Tsukui et al. | |
| 4,542,079 A | 9/1985 | Takeuchi et al. | |
| 4,598,137 A | 7/1986 | Guiver et al. | |
| 4,612,261 A | 9/1986 | Tsukui et al. | |
| 4,673,624 A | 6/1987 | Hockaday | |
| 4,751,274 A | 6/1988 | Ittemann et al. | |
| 4,755,272 A | 7/1988 | Plowman | |
| 4,797,190 A | 1/1989 | Peck | |
| 4,828,941 A | 5/1989 | Sterzel | |
| 4,855,193 A | 8/1989 | McElroy | |
| 4,774,153 A | 9/1989 | Sterzel | |
| 4,865,925 A | 9/1989 | Ludwig et al. | |
| 4,876,115 A | 10/1989 | Raistrick | |
| 4,964,890 A | 10/1990 | Reuter et al. | |
| 5,061,581 A | 10/1991 | Narang et al. | |
| 5,102,751 A | 4/1992 | Narang et al. | |
| 5,186,877 A | 2/1993 | Watanabe | |
| 5,211,984 A | 5/1993 | Wilson | |
| 5,234,777 A | 8/1993 | Wilson | |
| 5,252,410 A | 10/1993 | Wilkinson et al. | |
| 5,262,250 A | 11/1993 | Watanabe | |
| 5,312,876 A | 5/1994 | Dang et al. | |
| 5,312,895 A | 5/1994 | Dang et al. | |
| 5,330,860 A | 7/1994 | Grot et al. | |
| 5,346,780 A | 9/1994 | Suzuki | |
| 5,362,836 A | 11/1994 | Helmer-Metzmann et al. | |
| 5,367,051 A | 11/1994 | Narang et al. | |
| 5,403,675 A | 4/1995 | Ogata et al. | |
| 5,438,082 A | 8/1995 | Helmer-Metzmann et al. | |
| 5,468,574 A | 11/1995 | Ehrenberg et al. | |
| 5,470,448 A | 11/1995 | Molter et al. | |
| 5,472,799 A | 12/1995 | Watanabe | |
| 5,480,735 A | 1/1996 | Landsman et al. | |
| 5,482,568 A | 1/1996 | Hockaday | |
| 5,488,087 A | 1/1996 | Cabasso et al. | |
| 5,505,851 A | 4/1996 | Wagener et al. | |
| 5,523,177 A | 6/1996 | Kosek et al. | |
| 5,525,436 A | 6/1996 | Savinell et al. | |

(Continued)

FOREIGN PATENT DOCUMENTS

DE 3402471 A1 8/1985

(Continued)

OTHER PUBLICATIONS

Liu et al., Gaofenzi Xuebao (2), 205-209 (2001).*

(Continued)

*Primary Examiner*—Ling-Sui Choi
(74) *Attorney, Agent, or Firm*—Morgan Lewis & Bockius LLP

(57) ABSTRACT

This invention relates to ion conducting random copolymers that are useful in forming polymer electrolyte membranes used in fuel cells.

14 Claims, 1 Drawing Sheet

U.S. PATENT DOCUMENTS

| | | |
|---|---|---|
| 5,540,981 A | 7/1996 | Gallagher et al. |
| 5,547,911 A | 8/1996 | Grot |
| 5,548,055 A | 8/1996 | Narang et al. |
| 5,561,202 A | 10/1996 | Helmer-Metzmann et al. |
| 5,573,866 A | 11/1996 | Van Dine et al. |
| 5,573,867 A | 11/1996 | Zafred et al. |
| 5,599,638 A | 2/1997 | Surampudi et al. |
| 5,624,965 A | 4/1997 | Huang et al. |
| 5,631,099 A | 5/1997 | Hockaday |
| 5,633,098 A | 5/1997 | Narang et al. |
| 5,635,039 A | 6/1997 | Cisar et al. |
| 5,656,389 A | 8/1997 | Tetzlaff et al. |
| 5,672,439 A | 9/1997 | Wilkinson et al. |
| 5,702,755 A | 12/1997 | Mussell |
| 5,702,838 A | 12/1997 | Yasumoto et al. |
| 5,723,086 A | 3/1998 | Ledjeff et al. |
| 5,731,104 A | 3/1998 | Ventura et al. |
| 5,741,408 A | 4/1998 | Helmer-Metzmann et al. |
| 5,759,712 A | 6/1998 | Hockaday |
| 5,773,162 A | 6/1998 | Surampudi et al. |
| 5,773,480 A | 6/1998 | Stone |
| 5,783,325 A | 7/1998 | Cabasso et al. |
| 5,795,496 A | 8/1998 | Yen et al. |
| 5,795,668 A | 8/1998 | Banerjee |
| 5,804,325 A | 9/1998 | Yepez |
| 5,834,523 A | 11/1998 | Steck et al. |
| 5,834,566 A | 11/1998 | Helmer-Metzmann et al. |
| 5,869,416 A | 2/1999 | Mussell |
| 5,874,182 A | 2/1999 | Wilkinson et al. |
| 5,882,810 A | 3/1999 | Mussell et al. |
| 5,885,338 A | 3/1999 | Nigam et al. |
| 5,906,716 A | 5/1999 | Mertesdorf et al. |
| 5,945,231 A | 8/1999 | Narayanan et al. |
| 5,952,119 A | 9/1999 | Wilson |
| 5,958,613 A | 9/1999 | Hamada et al. |
| 5,958,616 A | 9/1999 | Salinas et al. |
| 5,973,025 A | 10/1999 | Nigam et al. |
| 5,985,477 A | 11/1999 | Iwasaki et al. |
| 5,985,942 A | 11/1999 | Steck et al. |
| 5,992,008 A | 11/1999 | Kindler |
| 6,024,848 A | 2/2000 | Dufner et al. |
| 6,025,085 A | 2/2000 | Savinell et al. |
| 6,040,077 A | 3/2000 | Debe et al. |
| 6,045,934 A | 4/2000 | Enami |
| 6,068,941 A | 5/2000 | Fuller et al. |
| 6,071,635 A | 6/2000 | Carlstrom et al. |
| 6,080,500 A | 6/2000 | Fuju et al. |
| 6,083,638 A | 7/2000 | Taniguchi et al. |
| 6,090,193 A | 7/2000 | Nigam et al. |
| 6,103,411 A | 8/2000 | Matsubayashi et al. |
| 6,106,965 A | 8/2000 | Hirano et al. |
| 6,110,616 A | 8/2000 | Sheikh-Ali et al. |
| 6,117,222 A | 9/2000 | Nigam et al. |
| 6,117,579 A | 9/2000 | Gyoten et al. |
| 6,136,463 A | 10/2000 | Kindler et al. |
| 6,146,781 A | 11/2000 | Surampudi et al. |
| 6,150,047 A | 11/2000 | Yen et al. |
| 6,171,444 B1 | 1/2001 | Nigam |
| 6,171,721 B1 | 1/2001 | Narayanan et al. |
| 6,180,274 B1 | 1/2001 | Yoshimoto et al. |
| 6,194,474 B1 | 2/2001 | Kerres et al. |
| 6,214,488 B1 | 4/2001 | Helmer-Metzmann et al. |
| 6,221,523 B1 | 4/2001 | Chun et al. |
| 6,228,518 B1 | 5/2001 | Kindler |
| 6,241,787 B1 | 6/2001 | Nigam |
| 6,248,460 B1 | 6/2001 | Surampudi et al. |
| 6,248,469 B1 | 6/2001 | Formato et al. |
| 6,248,480 B1 | 6/2001 | Narang et al. |
| 6,254,748 B1 | 7/2001 | Surampudi et al. |
| 6,265,093 B1 | 7/2001 | Surampudi et al. |
| 6,277,447 B1 | 8/2001 | Chun et al. |
| 6,291,093 B1 | 9/2001 | Kindler et al. |
| 6,294,614 B1 | 9/2001 | Kataoka et al. |
| 6,299,744 B1 | 10/2001 | Narayanan et al. |
| 6,300,381 B1 | 10/2001 | Kerres et al. |
| 6,303,244 B1 | 10/2001 | Surampudi et al. |
| 6,309,772 B1 | 10/2001 | Zuber et al. |
| 6,326,097 B1 | 12/2001 | Hockaday |
| 6,329,094 B1 | 12/2001 | Yasuo et al. |
| 6,355,149 B1 | 3/2002 | Soczka-Guth et al. |
| 6,368,492 B1 | 4/2002 | Narayanan et al. |
| 6,383,676 B1 | 5/2002 | Akiyama et al. |
| 6,391,486 B1 | 5/2002 | Narayanan et al. |
| 6,399,235 B1 | 6/2002 | Yen et al. |
| 6,420,059 B1 | 7/2002 | Surampudi et al. |
| 6,426,160 B1 | 7/2002 | Hagino et al. |
| 6,432,284 B1 | 8/2002 | Narayanan et al. |
| 6,444,341 B1 | 9/2002 | Yen et al. |
| 6,451,921 B2 | 9/2002 | Weisse et al. |
| 6,468,696 B1 | 10/2002 | Siling et al. |
| 6,492,054 B1 | 12/2002 | Karakane et al. |
| 6,503,378 B1 | 1/2003 | Fisher |
| 6,503,650 B1 | 1/2003 | Yasuo et al. |
| 6,509,441 B1 | 1/2003 | Kerres |
| 6,586,561 B1 | 7/2003 | Litt et al. |
| 6,589,684 B1 | 7/2003 | Surampudi et al. |
| 6,602,630 B1 | 8/2003 | Gopal |
| 6,699,611 B2 | 3/2004 | Kim et al. |
| 2001/0037000 A1 | 11/2001 | Goto et al. |
| 2001/0041279 A1 | 11/2001 | Terahara et al. |
| 2001/0050230 A1 | 12/2001 | Surampudi et al. |
| 2002/0001744 A1 | 1/2002 | Tsusaka et al. |
| 2002/0004159 A1 | 1/2002 | Totsuka |
| 2002/0015868 A1 | 2/2002 | Surampudi et al. |
| 2002/0015872 A1 | 2/2002 | Surampudi et al. |
| 2002/0045085 A1 | 4/2002 | Formato et al. |
| 2002/0058178 A1 | 5/2002 | Narayanan et al. |
| 2002/0061431 A1 | 5/2002 | Koyama et al. |
| 2002/0071977 A1 | 6/2002 | Lakshmanan et al. |
| 2002/0091225 A1 | 7/2002 | McGrath et al. |
| 2002/0093008 A1 | 7/2002 | Kerres et al. |
| 2002/0103327 A1 | 8/2002 | Claub et al. |
| 2002/0127450 A1 | 9/2002 | Xie |
| 2002/0127454 A1 | 9/2002 | Narang et al. |
| 2002/0142207 A1 | 10/2002 | Watakabe et al. |
| 2002/0161174 A1 | 10/2002 | Sasaki et al. |
| 2002/0164513 A1 | 11/2002 | Asano et al. |
| 2002/0172850 A1 | 11/2002 | Asano et al. |
| 2002/0177656 A1 | 11/2002 | Goto et al. |
| 2002/0187377 A1 | 12/2002 | Shinoda et al. |
| 2002/0187379 A1 | 12/2002 | Yasuo et al. |
| 2002/0188097 A1 | 12/2002 | Goto et al. |
| 2003/0013817 A1 | 1/2003 | Lu |
| 2003/0044669 A1 | 3/2003 | Hidaka et al. |
| 2003/0059657 A1 | 3/2003 | Stone et al. |
| 2003/0077503 A1 | 4/2003 | Yoshitake et al. |
| 2003/0099874 A1 | 5/2003 | Kim et al. |
| 2003/0173547 A1 | 9/2003 | Yamakawa et al. |

FOREIGN PATENT DOCUMENTS

| | | |
|---|---|---|
| DE | 19909028 A1 | 9/2000 |
| DE | 10149035 A1 | 4/2003 |
| EP | 0 068 508 B1 | 1/1983 |
| EP | 0 337 626 A1 | 10/1989 |
| EP | 0 574 791 B1 | 6/1993 |
| EP | 1450430 A | 8/2004 |
| JP | 06 080799 A | 6/1994 |
| JP | 2003 137981 | 9/2003 |
| WO | WO 98/22989 A1 | 5/1998 |
| WO | WO 99/48932 A | 9/1999 |
| WO | WO 99/54389 A1 | 10/1999 |
| WO | WO 99/54407 A2 | 10/1999 |
| WO | WO 00/09610 A1 | 2/2000 |

| WO | WO 00/22684 A2 | 4/2000 |
| --- | --- | --- |
| WO | WO 00/22684 A3 | 4/2000 |
| WO | WO 00/24796 A1 | 5/2000 |
| WO | WO 00/27513 A2 | 5/2000 |
| WO | WO 01/64322 A | 9/2001 |

OTHER PUBLICATIONS

Gan, D., et al., "Synthesis and characterization of poly(ether ketone ketone) (PEKK)/sodium sulfonated poly(arylene ether ketone) (S-PAEK) block copolymers," *Polym. Int.* 50(7):812-816 (Jul. 2001).

Ghassemi, H., et al., "New multiblock copolymers of sulfonated poly(4-phenyl-2,5-benzophenone) and poly(arylene ether sulfone) for proton exchange membrane," *Polymer Preprints* 44(1):814-815 (2003).

Guyu Xiao, et al., *Sulfonated Poly(thioether Ketone)s With High Oxidation Resistance to Peroxides*, Polymer Preprints 2003, 44(I) 1235-1236.

J. Kerres, et al., *Application of Different Types of Polyaryl-Blend-Membranes in DMFC*, Journal of New Materials for Electrochemical Systems 5, (2002), pp. 97-107.

Liu Shengzhou, et al. *Synthesis and Characterization of Novel Sodium Sulfonate-Functionalized Poly(Ether Ether Ketone)s containing Cyclohexyl Side Groups*, Changchun Institute of Applied Chemistry, Chinese Academy of Sciences, Changchun 130022, 2001, pp. 205-209.

Liu, S., et al., "Novel sodium sulfonate-functionalized poly(ether ether ketone)s derived from 4,4'-thiodiphenol," *Polymer* 42(7):3293-3296 (Mar. 2001).

Liu, S., et al., "Synthesis and characterization of new sodium sulfonate-functionalized poly(ether ether ketones) containing cyclohexyl side groups," *Gaofenzi Xuebao* 2:205-209 (1991) (Abstract).

Liu, S., et al., "Synthesis of Poly(ether ether ketone)s with high content of sodium sulfonate groups as gas dehumidification membrane materials," *Macromol. Rapid Commun.* 22(8):579-582 (2001).

Martin Hograth, et al., *High Temperature Membranes for Solid Polymer Fuel Cells*, Report Issued by Johnson Matthey Technology Centre to the ETSU on behalf of the Department of Trade and Industry as ETSU F/02/00189/REP; DTI/Pub URN 01/893, First Published 2001.

Mecham, J.B., et al., "Sulfonated poly(arylene ether)—B—poly(imide) segmented copolymers," *Polymeric Mat. Sci. Eng.* 84:105-106 (Apr. 2001).

Miyatake, K., et al., "Synthesis and Proton Conductivity of Highly Sulfonated Poly(thiophenylene)," *Macromolecules* 30:2941-2946 (1997).

Miyatake, K., et al., "Synthesis of Poly(phenylene sulfide sulfonic acid) via Poly(sulfonium cation) as a Thermostable Proton-Conducting Polymer," *Macromolecules* 29:6969-6971 (1996).

Parsons, R.,e t al., "The oxidation of small organic molecules: A survey of recent fuel cell related research." *J. Electroanal. Chem.* 2579-45 (1989).

Rulkens, R., et al., "Rigid-Rod Polyelectrolytes based on poly(p-phenylene sulfonic acid)." *Ber. Bunsenges. Phys. Chem.* 100(6):707-714 (1996).

Ueda, M., et al., "Synthesis and characterization of aromatic poly(ether sulfone)s containing pendant sodium sulfonate groups," *J. Polymer Sci. A* 31:852-858 (1992).

Wang, F., et al., "Sodium sulfonate-functionalized poly(ether ether ketone)s," *Macromol. Chem. Phys.* 199:1421-1426 (1998).

Wang, J.-T., et al., "A $H_2/O_2$ Fuel Cell Using Acid Doped Polybenzimidazole as Polymer Electrolyte," *Proc. 1st Intl. Symp. Proton Conducting Membrane Fuel Cells I*, S. Gottesfeld, et al. (eds.), Electrochem. Soc. Proc. 95(23):202-213 (1995).

Wiles, K., et al., "Synthesis and characterization of sulfonated poly(arylene sulfide sulfone copolymers as candidates for proton exchange membranes," *Polymer Preprints* 43(2):993-994 (2002) (Abstract).

Wiles, K.B., et al., "Poly(arylene thioether sulfone) copolymers for PEM-based fuel cell systems," *Polymer Preprints* 44(1):1089-1090 (2003).

William L. Harrison, et al., *Sulfonated Poly(arlyene Ether Sulfones) Containing Hexafluoroisopropylidne Unit: Influence of Sulfonic Acid Position on Stability and Other Properties*, Polymer Preprints 2003, 44(I), 849.

Wnek, G.E., et al., "New hydrocarbon proton exchange membranes based on sulfonated styrene-ethylene/butylene-styrene triblock copolymers," *Electrochem. Soc. Proc.* 95(23):247-250 (1995).

Xiao, G. et al., "Polyelectrolytes for Fuel Cells Made of Sulfonated Poly(phthalazinone ether ketone)s." *Macromol. Rapid Commun.* 23(8):488-492 (2002).

Xiao, G., et al., "Synthesis and characterization of novel sulfonated poly(arylene ether ketone)s derived from 4,4'-sulfonyl-diphenol," *Polymer Bull.* 48(4-5): 309-315 (Jun. 2002).

* cited by examiner

ION CONDUCTIVE RANDOM COPOLYMERS

CROSS-REFERENCE TO RELATED APPLICATIONS

This application is a CIP of U.S. application Ser. No. 10/438,186, filed May 13, 2003, now U.S. Pat. Nos. 7,202,001, which claims benefit of 60/426,540, filed Nov. 15, 2002; 60/446,395, filed Feb. 10, 2003; and 60/381,136, filed May 14, 2002.

TECHNICAL FIELD

This invention relates to ion conductive random copolymers that are useful in forming polymer electrolyte membranes used in fuel cells.

BACKGROUND OF THE INVENTION

Fuel cells have been projected as promising power sources for portable electronic devices, electric vehicles, and other applications due mainly to their non-polluting nature. Of various fuel cell systems, the polymer electrolyte membrane based fuel cell technology such as direct methanol fuel cells (DMFCs) has attracted much interest thanks to their high power density and high energy conversion efficiency. The "heart" of a polymer electrolyte membrane based fuel cell is the so called "membrane-electrode assembly" (MEA), which comprises a proton conducting polymer electrolyte membrane (PEM), catalyst disposed on the opposite surfaces of the PEM to form a catalyst coated member (CCM) and a pair of electrodes (ie., an anode and a cathode) disposed to be in electrical contact with the catalyst layer.

Proton-conducting membranes for DMFCs are known, such as Nafion® from the E.I. Dupont De Nemours and Company or analogous products from Dow Chemicals. These perfluorinated hydrocarbon sulfonate ionomer products, however, have serious limitations when used in DMFC's. Nafion® loses conductivity when the operation temperature of the fuel cell is over 80° C. Moreover, Nafion® has a very high methanol crossover rate, which impedes its applications in DMFCs.

U.S. Pat. No. 5,773,480, assigned to Ballard Power System, describes a partially fluorinated proton conducting membrane from α, β, β-trifluorostyrene. One disadvantage of this membrane is its high cost of manufacturing due to the complex synthetic processes for monomer α,β,β-trifluorostyrene and the poor sulfonation ability of poly (α, β, β-trifluorostyrene). Another disadvantage of this membrane is that it is very brittle, thus has to be incorporated into a supporting matrix.

U.S. Pat. Nos. 6,300,381 and 6,194,474 to Kerrres, et al. describe an acid-base binary polymer blend system for proton conducting membranes, wherein the sulfonated poly (ether sulfone) was made by post-sulfonation of the poly (ether sulfone).

M. Ueda in the Journal of Polymer Science, 31(1993): 853, discloses the use of sulfonated monomers to prepare the sulfonated poly(ether sulfone polymers).

U.S. patent application US 2002/0091225A1 to McGrath, et al. used this method to prepare sulfonated polysulfone polymers.

The need for a good membrane for fuel cell operation requires balancing of various properties of the membrane. Such properties included proton conductivity, methanol-resistance, chemical stability and methanol crossover, fast start up of DMFCs, and durability to cell performance. In addition, it is important for the membrane to retain its dimensional stability over the fuel operational temperature range. In DMFC's methanol oxidation generates enough heat to raise the cell temperature. If the membrane swells significantly, it will increase methanol crossover. The membrane thus gradually loses its ability to block methanol crossover, resulting in degradation of cell performance. The dimension changes of the membrane also put a stress on the bonding of the membrane-electrode assembly (MEA). Often this results in delamination of the membrane from the electrode after excessive swelling of the membrane. Therefore, maintaining the dimensional stability over a wide temperature range and avoiding excessive membrane swelling are important for DMFC applications.

SUMMARY OF THE INVENTION

In one aspect, the invention provides sulfonated random copolymer compositions which can be used to fabricate polymer electrolyte membranes (PEM's), catalyst coated membrane (CCM's) and membrane electrode assemblies (MEAs) which are useful in fuel cells.

The invention includes three classes of random ion conductive copolymers. Such random polymers are of the following formulas:

Formula I

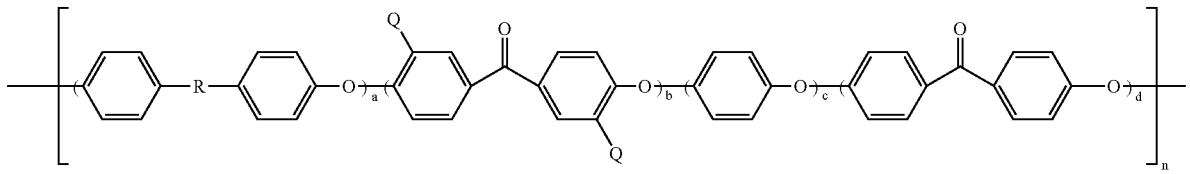

wherein R is a single bond, a cycloaliphatic of the formula $C_nH_{2n-2}$;

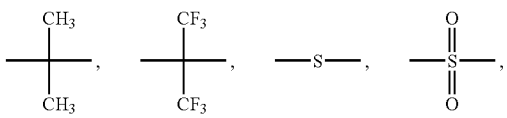

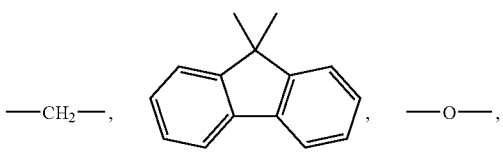

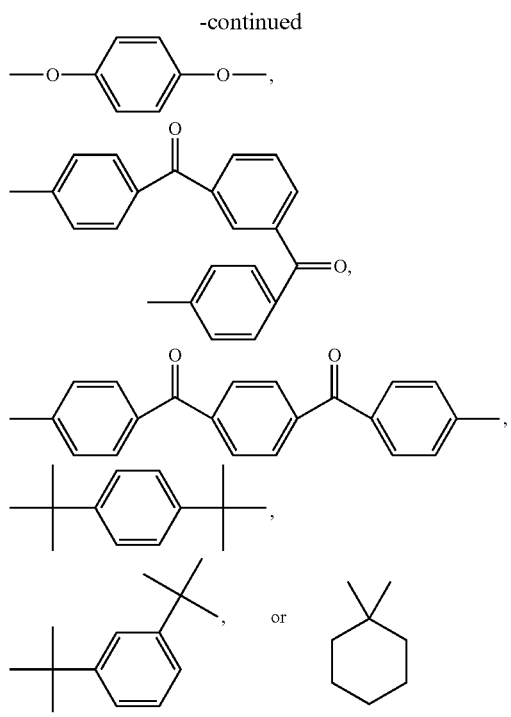

wherein a, b, c and d are mole fractions of the monomer present in the copolymer where each are independently, from 0.01 to 1;

Q is an ion conducting group comprising —SO$_3$X, —COOX —PO$_3$X or —SO$_2$—NH—SO$_2$R$_f$, where R$_f$ is a prefluoronated hydrocarbon having 1-20 carbon atoms; and wherein X is a cation or a proton.

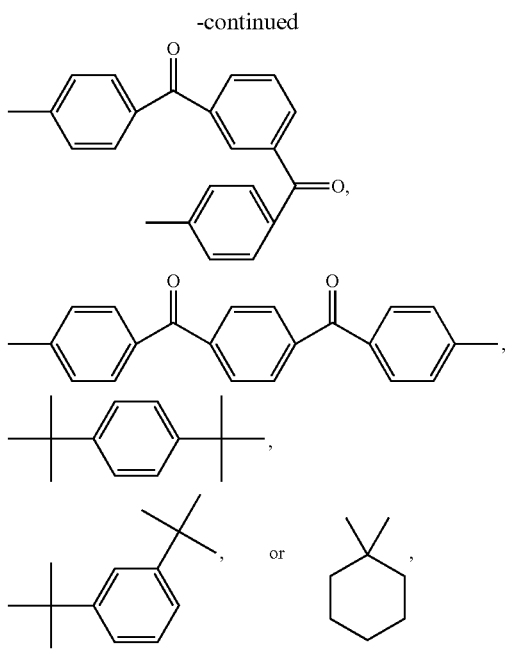

where R3 is aryl ketone, aryl sulfone, aryl nitrile, and substituted aryl nitrile;

wherein a, b, c and d are mole fractions of the monomer present in the copolymer where each are independently, from 0.01 to 1;

Q is an ion conducting group comprising —SO$_3$X, —COOX —PO$_3$X or —SO$_2$—NH—SO$_2$R$_f$, and wherein X is a cation or a hydrogen atom.

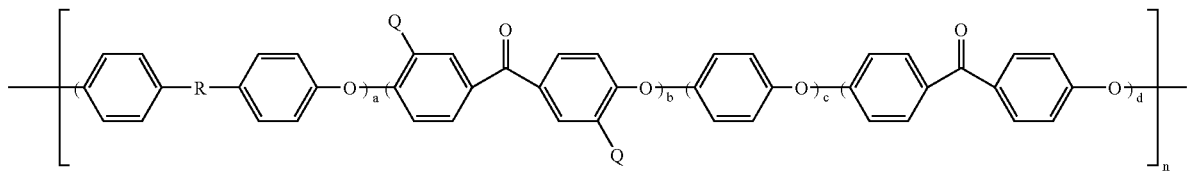

Formula II wherein R1 or R2 are independently a single bond, a cycloaliphatic of the formula C$_n$H$_{2n-2}$,

In another embodiment, four comonomers are used to make the ion conductive copolymer, where at least one comonomer is ion conducting. A specific embodiment is set forth in Formula III.

—(Ar$_1$X$_1$Ar$_2$X$_2$Ar$_3$X$_3$)$_a$/—(Ar$_4$—X$_4$—Ar$_5$—X$_5$—Ar$_6$—X$_6$)—$_b$    Formula III where Ar$_1$, Ar$_2$, Ar$_4$, Ar$_5$ are independently phenyl, substituted phenyl napthyl, terphenyl, aryl nitrile, substitute aryl nitrile, and Ar$_4$ and/or Ar$_5$ further comprise an ion conducting group, X$_1$ and X$_4$ are independently —C(O)— or —S(O)$_2$, X$_2$, X$_3$, X$_5$ and X$_6$ are independently —O— or —S—.

Ar$_3$ and Ar$_6$ are the same or different from each other and are:

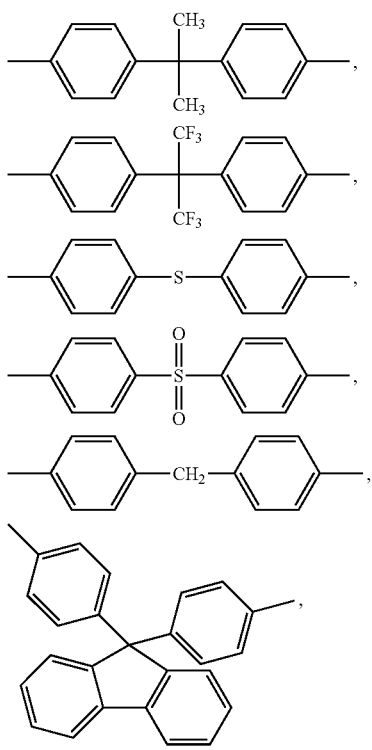

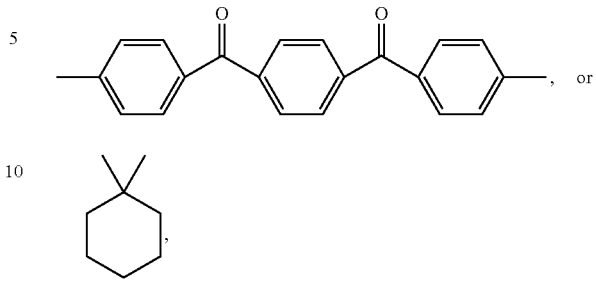

wherein the ion conductive group comprises —SO3H, —COOH, —HPO3H or —SO2NH—SO2—RF where RF is a perfluorinated hydrocarbon having 1-20 carbon atoms and said ion conducting group are pendant to the copolymer backbone;

wherein a is between 0.01 and 0.99, b is between 0.01 and 0.99, a+b=1.0.

In some embodiments, at least one of $X_2$, $X_3$, $X_5$ and/or $X_6$ is S. In some embodiments, $X_1$ and/or $X_4$ is —S(O)$_2$—. In other embodiments, $X_1$ and/or $X_4$ is —C(O)—. In still other embodiments, $X_1$ is —S(O)$_2$— and $X_4$ is —C(O)—. In other embodiments, $A_3$ and $A_6$ are different.

A particularly preferred embodiment is Formula IV:

Formula IV

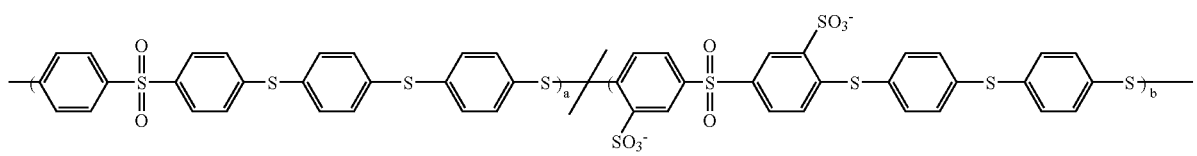

Where A=0.60 and B=0.40

DETAILED DESCRIPTION

Figure 1:
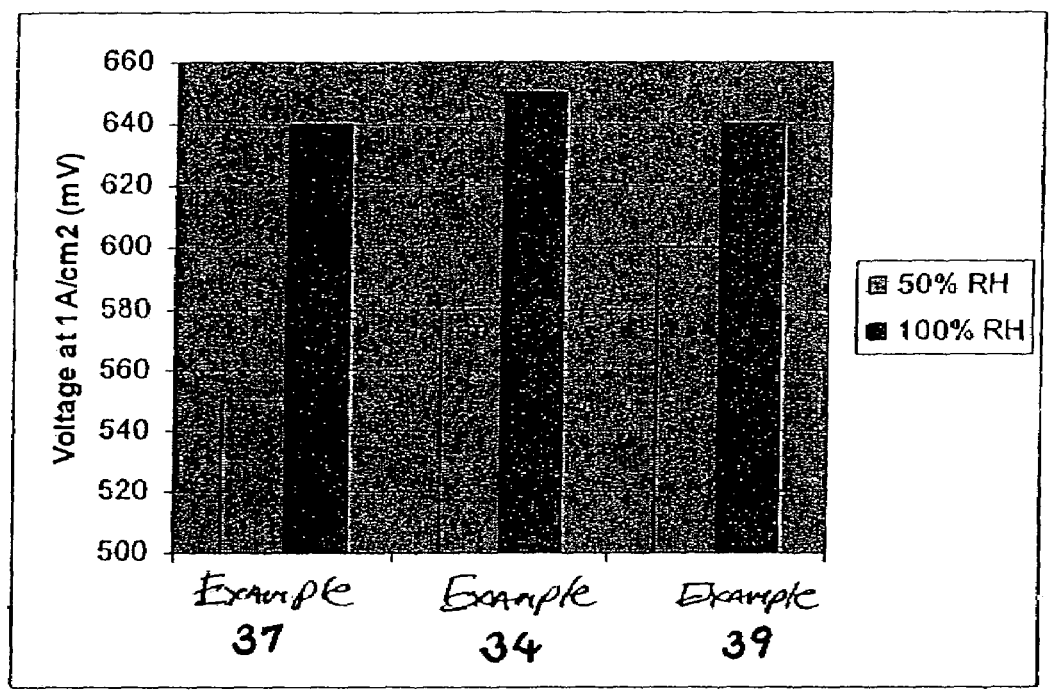
FIG. 1 demonstrates the performance of DMAc containing PEM's made of the copolymers of Example 20, Example 17 and Example 22 as compared between 50 and 100% relative humidity.

The invention provides random copolymers that are ion conductive. One use of such polymeric material is in the formation of polymer electrolyte membranes (PEMs), catalyst coated membrane (CCM) and membrane electrode assemblies (MCA's), which may be used in fuel DMFC's fuel cells.

In one embodiment, random ion conductive copolymers can be made having the following formula:

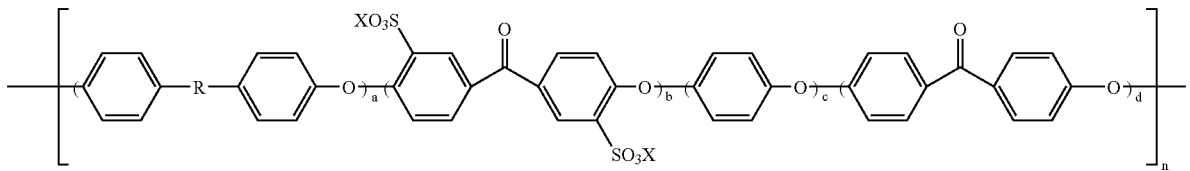

Formula V wherein R is a bond, a cycloaliphatic of the formula $C_nH_{2n-2}$,

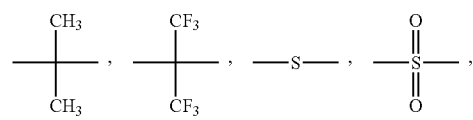
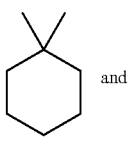

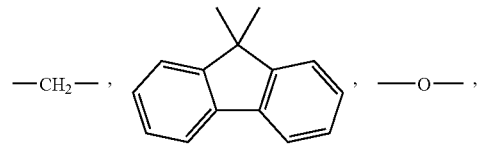

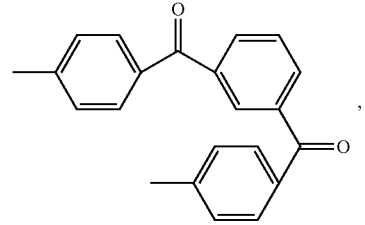

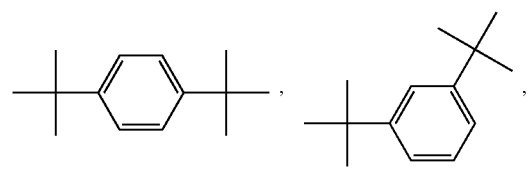

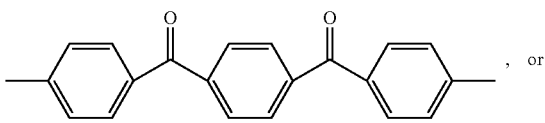, or

-continued and

Q is an ion conducting group comprising —$SO_3X$, —COOX —$PO_3X$ or —$SO_2$—NH—$SO_2R_f$ where $R_f$ is a perfluorinated hydrocarbon of 1-20 carbon atoms and where X is a cation or probe.

In this copolymer, a, b, c and d are mole fractions of each of the monomers present in the copolymer where each are independently, from 0.01 to about 1. In one particular embodiment, R is isopropylidene, cyclohexylidene, 11.4 diphenylene di-isopropylene.

In general, the sulfonated copolymers include reaction products wherein (a+c)=(b+d), a is from about 0.05 to about 0.95, b is from about 0.01 to about 0.95, c is from about 0 to about 0.95 and d is from about 0 to about 0.99. Preferably, a is from about 0.10 to about 1.00, b is from about 0.05 to about 0.85, c is from about 0 to about 0.90 and d is from about 0.15 to about 0.95. Most preferably, a is from about 0.20 to about 0.9, b is from about 0.10 to about 0.45, c is from about 0 to about 0.80 and d is from about 0.55 to about 0.90.

In another embodiment, the invention pertains to random ion conductive copolymers and proton exchange membranes having the formula:

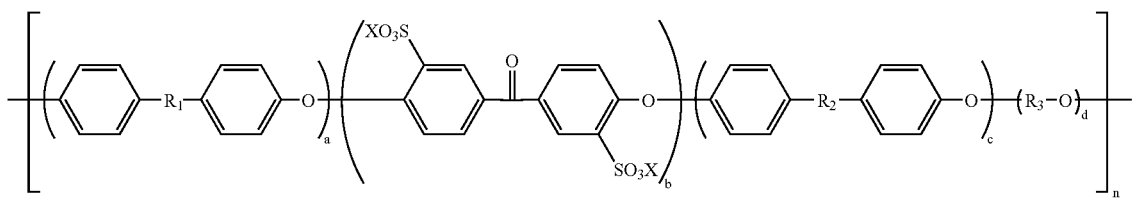

Formula VI wherein $R_1$ or $R_2$ is a single bond, a cycloaliphatic of the formula $C_nH_{2n-2}$,

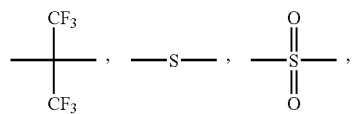

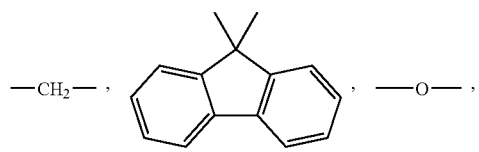

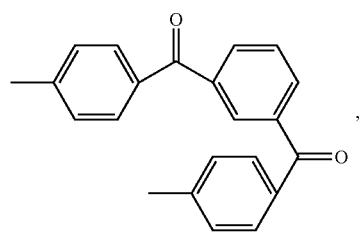

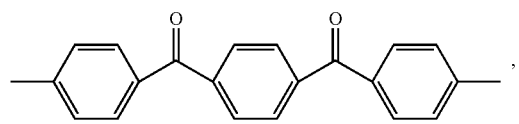

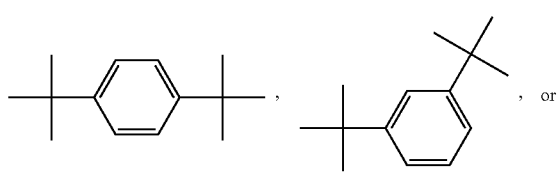

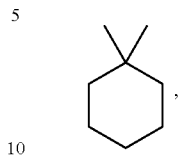

wherein R3 is aryl ketone, aryl sulfone, aryl nitrile, and substituted aryl nitrile.

wherein a, b, c and d are mole fractions of the monomer present in the copolymer where each are independently, from 0.01 to 1;

Q is an ion conducting group comprising —SO$_3$X, —COOX —PO$_3$X or —SO$_2$—NH—SO$_2$R$_f$, where R$_f$ is a prefluoronated hydrocarbon having 1-20 carbon atoms; and wherein X is a cation or a proton.

In the sulfonated copolymer, a, b, c and d are mole fractions for each monomer present in the copolymer, each independently from 0.01 to about 1 and X is a cation or a hydrogen atom. In a preferred embodiment, R1 is cyclohexydyl, and R2 is fluorenyl.

In general, the sulfonated copolymers include reaction products wherein (a+c)=1.00, (b+d)=1.00, a is from about 0.05 to about 1.00, b is from about 0.01 to about 1.00, c is from about 0 to about 0.95 and d is from about 0 to about 0.99. Preferably, a is from about 0.10 to about 1.00, b is from about 0.05 to about 0.85, c is from about 0 to about 0.90 and d is from about 0.15 to about 0.95. Most preferably, a is from about 0.20 to about 1.00, b is from about 0.10 to about 0.45, c is from about 0 to about 0.80 and d is from about 0.55 to about 0.90.

A particularly preferred random copolymer is:

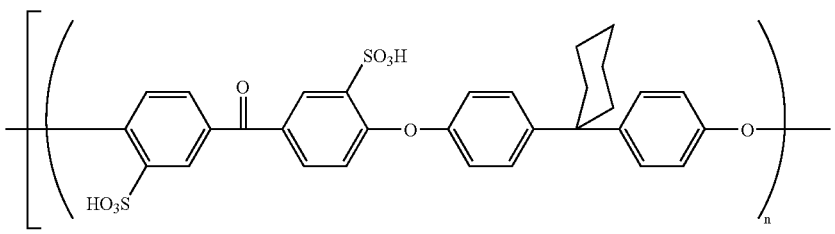

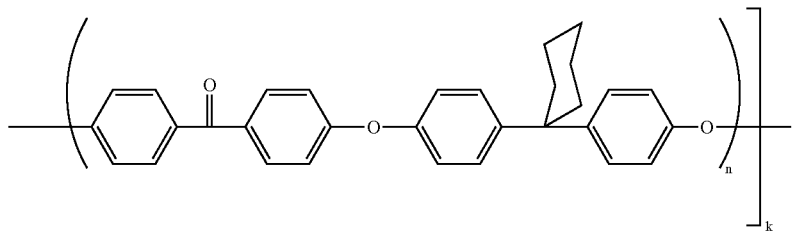

where n and m are mole fractions and, n plus m equals 1, n is between 0.1 and 0.5, more preferably between 0.2 and 0.4 and most preferably between 0.25 and 0.35, m is 1 minus n, and k is between 40 and 200 more preferably between 50 and 100.

In a particularly preferred polymer, n is 0.3 and m is 0.7 and has the formula:

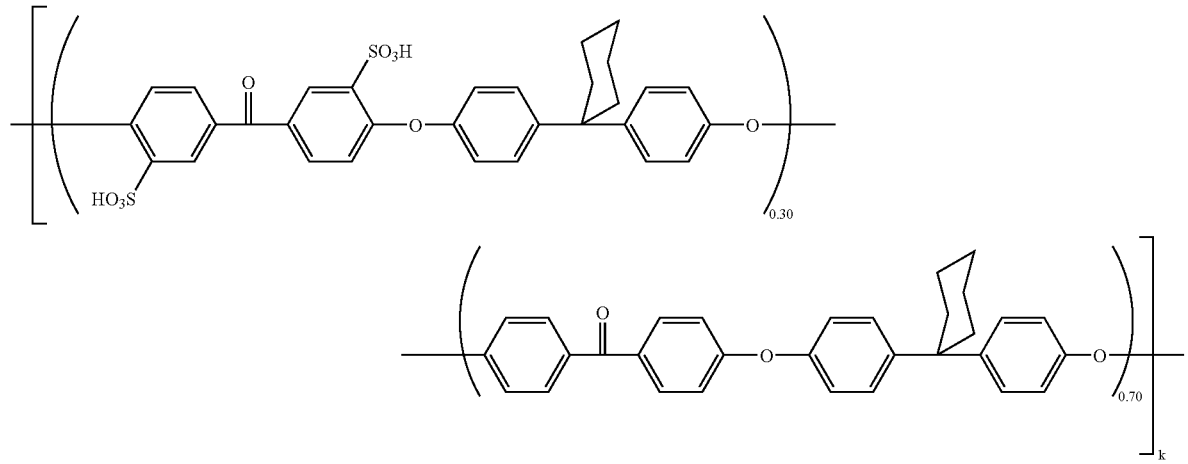

where k is between 40 and 200.

Ion conductive polymers can also be represented by Formula III:

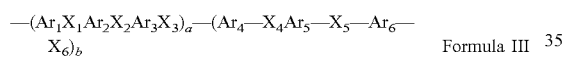  Formula III where $Ar_1$, $Ar_2$, $Ar_4$, $Ar_5$ are independently phenyl, substituted phenyl napthyl, terphenyl, aryl nitrile, substitute aryl nitrile, and $Ar_4$ and/or $Ar_5$ further comprise an ion conducting group, $X_1$ and $X_4$ are independently —C(O)— or —S(O)$_2$—, $X_2$, $X_3$, $X_5$ and $X_6$ are independently —O— or —S—.

$Ar_3$ and $Ar_6$ are the same or different from each other and are

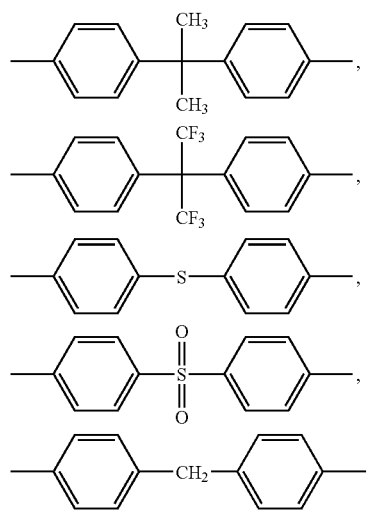

-continued

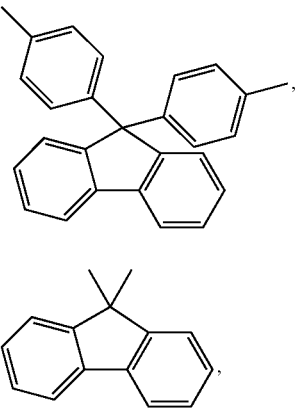

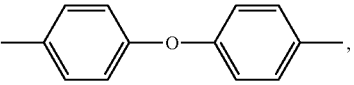

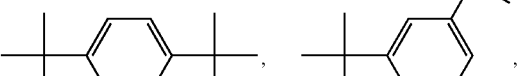

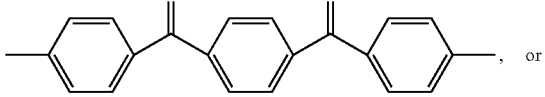, or

-continued

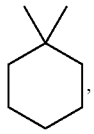

wherein the ion conductive groups comprise $S_3^{31}$, $-COO^{31}$, $H_2PO_3^{31}$ or sulfonimide. wherein a is between 0.01 and 0.99, b is between 0.01 and 0.99, a+b=1.0.

A particularly preferred embodiment is Formula IV:

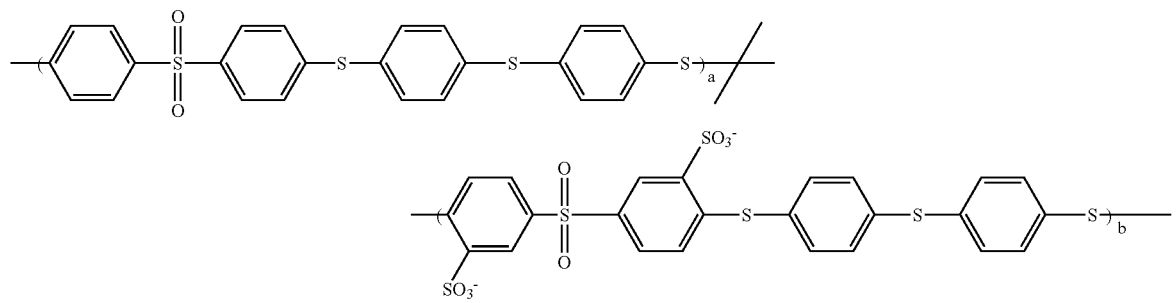

Where A=0.60 and B=0.40

Polymer membranes may be fabricated by solution casting of the ion conductive copolymer. Alternatively, the polymer membrane may be fabricated by solution casting the ion conducting polymer the blend of the acid and basic polymer.

When cast into a membrane for use in a fuel cell, it is preferred that the membrane thickness be between 1 to 10 mils, more preferably between 2 and 6 mils, most preferably between 3 and 4 mils.

As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion membrane of the same thickness. In preferred embodiments the permeability of methanol is preferably 50% less than that of a Nafion membrane, more preferably 75% less and most preferably greater than 80% less as compared to the Nafion membrane.

After the sulfonated random copolymer has been formed into a membrane (PEM), it may be used to produce a catalyst coated membrane (CCM). As used herein, a CCM comprises a PEM where at least one side and preferably both of the opposing sides of the PEM are partially or completely coated with catalyst layers. The catalyst is preferable a layer made of catalyst and ionomer. Preferred catalysts are Pt and Pt—Ru. Preferred ionomers include Nafion and other ion conductive polymers.

In general, anode and cathode catalysts are applied onto the membrane by well established standard techniques. For direct methanol fuel cells, platinum/ruthenium catalyst is typically used on the anode side while platinum catalyst is applied on the cathode side and platinum is applied on the cathode side. Catalysts may be optionally supported on carbon. The catalyst is initially dispersed in a small amount of water (about 100 mg of catalyst in 1 g of water). To this dispersion a 5% Nafion solution in water/alcohol is added (0.25-0.75 g). The resulting dispersion may be directly painted onto the polymer membrane. Alternatively, isopropanol (1-3 g) is added and the dispersion is directly sprayed onto the membrane. The catalyst may also be applied onto the membrane by decal transfer, as described in the open literature (*Electrochimica Acta,* 40: 297 (1995)).

The CCM is used to make MEA's. As used herein, an MEA refers to an ion conducting polymer membrane made from a CCM according to the invention in combination with anode and cathode electrodes positioned to be in electrical contact with the catalyst layer of the CCM.

The electrodes are in electrical contact with a membrane, either directly or indirectly, when they are capable of completing an electrical circuit which includes the polymer membrane and a load to which a electric current is supplied. More particularly, a first catalyst is electrocatalytically associated with the anode side of the membrane so as to facilitate the oxidation of organic fuel. Such oxidation generally results in the formation of protons, electrons, carbon dioxide and water. Since the membrane is substantially impermeable to organic fuels such as methanol, as well as carbon dioxide, such components remain on the anodic side of the membrane. Electrons formed from the electrocatalytic reaction are transmitted from the cathode to the load and then to the anode. Balancing this direct electron current is the transfer of an equivalent number of protons across the membrane to the anodic compartment. There an electrocatalytic reduction of oxygen in the presence of the transmitted protons occurs to form water. In one embodiment, air is the source of oxygen. In another embodiment, oxygen-enriched air is used.

The membrane electrode assembly is generally used to divide a fuel cell into anodic and cathodic compartments. In such fuel cell systems, an organic fuel such as methanol is added to the anodic compartment while an oxidant such as oxygen or ambient air is allowed to enter the cathodic compartment. Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like. In addition, the fuel cells may be stacked to increase voltage and current capacity for use in high power applications such as industrial and residential services or used to provide locomotion to vehicles. Such fuel cell structures include those disclosed in U.S. Pat. Nos. 6,416,895, 6,413,664, 6,106,964, 5,840,438, 5,773,160, 5,750,281, 5,547,776, 5,527,363, 5,521,018, 5,514,487, 5,482,680, 5,432,021, 5,382,478, 5,300,370, 5,252,410 and 5,230,966.

Such CCM and MEM's are generally useful in fuel cells such as those disclosed in U.S. Pat. Nos. 5,945,231, 5,773,162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

In another aspect, the invention relates to methods for the preparation of the ion conducting (e.g., sulfonate) random copolymers that are useful as polymer electrolyte membranes. In general, the methods to prepare the include combining a first monomer having at least one ion conducting group such as a sulfonate group with a second comonomer. The first monomer should have at least two leaving groups and the second comonomer should have at least two groups that can displace at least one leaving group of the first monomer. A third comonomer is included that has at least two leaving groups, such that at least one of the displacing groups of the second comonomer can displace at least one of the leaving groups of the third comonomer.

In a particular embodiment for the preparation of such polymers, the process further includes the step of combining a fourth comonomer having at least two displacing groups that can react with the leaving groups of either the first comonomer or the third comonomer. The term "leaving group" is intended to include those functional moieties that can be displaced by a nucleophilic moiety found, typically, in another monomer. Leaving groups are well recognized in the art and include, for example, halides (chloride, fluoride, iodide, bromide), tosyl, mesyl, etc. In certain embodiments, the monomer has at least two leaving groups, which are "para" to each other with respect to the aromatic monomer to which they are attached.

The term "displacing group" is intended to include those functional moieties that can act typically as nucleophiles, thereby displacing a leaving group from a suitable monomer. The result is that the monomer to which the displacing group is attached becomes attached, generally covalently, to the monomer to which the leaving group was associated with. An example of this is the displacement of fluoride groups from aromatic monomers by phenoxide or alkoxide ions associated with aromatic monomers.

EXAMPLES

TABLE I

Monomers Used

| Acronym | Full name | Molecular weight | Chemical structure |
|---------|-----------|------------------|--------------------|
| 1) Difluoro-end monomers | | | |
| Bis K | 4,4'-Difluorobenzophenone | 218.20 | |
| Bis SO$_2$ | 4,4'-Difluorodiphenylsulfone | 254.25 | |
| S-Bis K | 3,3'-disulfonated-4,4'-difluorobenzophone | 422.28 | |
| 2) Dihydroxy-end monomers | | | |
| Bis AF(AF or 6F) | 2,2-Bis(4-hydroxyphenyl)hexafluoropropane or 4,4'-(hexafluoroisopropylidene)diphenol | 336.24 | |
| BP | Biphenol | 186.21 | |

TABLE I-continued

Monomers Used

| Acronym | Full name | Molecular weight | Chemical structure |
|---|---|---|---|
| Bis FL | 9,9-Bis(4-hydroxyphenyl)fluorene | 350.41 | |
| Bis Z | 4,4'-cyclohexylidenebisphenol | 268.36 | |
| Bis S | 4,4'-thiodiphenol | 218.27 | |
| 3) Dithiol-end monomers | | | |
| 3S | 4,4'-thiol bis benzene thiol | | |

Example 1

Sulfonated PEEK with Bisphenol A Composition

In a 500 ml three necked round flask, equipped with a mechanical stirrer, thermometer, nitrogen inlet and Dean-Stark trap/condenser, Bisphenol A (9.128 g), 4,4'-difluorobenzophenone (5.6732 g), sulfonated 4,4'-difluorobenzophenone (5.9108 g), anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175 to 180° C. for 6 h. The reaction mixture was precipitated with acetone or methanol to obtain the crude product, then washed with hot water four times. The dry polymer was dissolved in DMAC for 20% coating solution. The obtained 2 mil thick membrane was soaked in 1.5 M $H_2SO_4$ for 16 hr (overnight) and then rinsed in DI water for several times until no H2SO4 residue was detected.

The polymer membrane was swollen in water at room temperature and the polymer membrane conductivity was measured by AC impedance. The polymer membrane was swollen in an 8M methanol aqueous mixture at 80° C. for 24 hours to measure the dimensional stability.

Methanol crossover was measured in 8M MeOH using H-Cell, and the permeation rate was obtained by gas chromatography analysis.

The membrane conductivity: 0.021 S/cm, Swelling at 80 C, 8M: 620% by area 8M-MeOH Cross-over: $6.9 \times 10^{-7}$ $cm^2$/sec.

Example 2

Sulfonated PEEK with 50% Bisphenol A and 50% Hydroquinone Composition

In a 500 ml three necked round flask, equipped with a mechanical stirrer, thermometer, nitrogen inlet and Dean-Stark trap/condenser, bisphenol A (4.564 g), hydroquinone (2.202 g), 4,4'-difluorobenzophenone (5.6732 g), sulfonated 4,4'-difluorobenzophenone (5.9108 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 180° C. for 6 h. The reaction mixture was precipitated with acetone or methanol to get the crude product, then washed with hot water four times. The dry polymer was dissolved in DMAC for 20% coating solution. The obtained 2 mil thick membrane was soaked in 1.5M $H_2SO_4$ for 16 hr (overnight) and then rinsed in DI water for several times until no H2SO4 residue was detected.

The membrane conductivity: 0.027 S/cm.

Example 3

Sulfonated PEEK with 4,4'-Thiodiphenol Composition

In a 500 ml three necked round flask, equipped with a mechanical stirrer, thermometer, nitrogen inlet and Dean-Stark trap/condenser, 4,4'-thiodiphenol (8.728 g), 4,4'-difluorobenzophenone (5.6732 g), sulfonated 4,4'-difluorobenzophenone (5.9108 g) and anhydrous potassium carbonate (7.2 g) were dissolved in a mixture DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times.

The membrane conductivity: 0.021 S/cm

Example 4

Sulfonated PEEK with 4,4'-(Hexafluoroisopropyldene) diphenol Composition

In a 500 ml three necked round flask, equipped with a mechanical stirrer, thermometer, nitrogen inlet and Dean-Stark trap/condenser, 4,4'-(hexafluoroisopropyldene)diphenol (13.452 g), 4,4'-difluorobenzophenone (5.6732 g), sulfonated 4,4'-difluorobenzophenone (5.9108 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times. The dry polymer was dissolved in DMAC for 20% coating solution. The obtained 2 mil thick membrane was soaked in 1.5M $H_2SO_4$ for 16 hr (overnight) and then rinsed in DI water for several times until no H2SO4 residue was detected.

The membrane conductivity: 0.020 S/cm.

Example 5

Sulfonated PEEK with 50% 4,4'-(Hexafluoroisopropyldene) Diphenol and 50% Hydroquinone Composition In a 500 ml three necked round flask, equipped with a mechanical stirrer, thermometer, nitrogen inlet and Dean-Stark trap/condenser, 4,4'-(hexafluoroisopropyldene)diphenol (6.726 g), hydroquinone (2.202 g), 4,4'-difluorobenzophenone (5.6732 g), sulfonated 4,4'-difluorobenzophenone (5.910 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 180° C. for 6 h. The reaction mixture was precipitated with acetone or methanol to get the crude product, then washed with hot water four times. The dry polymer was dissolved in DMAC for 20% coating solution. The obtained 2 mil thick membrane was soaked in 1.5M $H_2SO_4$ for 16 hr (overnight) and then rinsed in DI water for several times until no $H_2SO_4$ residue was detected.

The membrane conductivity: 0.021 S/cm.

Example 6

Sulfonated PEEK with 4,4'-Cyclohexylidenebisphenol -hydroquinone Composition (95/5)

In a 500 ml three necked round flask, equipped with a mechanical stirrer, thermometer, nitrogen inlet and Dean-Stark trap/condenser, 4,4'-cyclohexylidenebisphenol (10.1977 gg), hydroquinone (0.2202 g), 4,4'-difluorobenzophone (6.1096 g), sulfonated 4,4'-difluorobenzophone (5.0664 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times. The dry polymer was dissolved in DMAC for 20% coating solution. The obtained 2 mil thick membrane was soaked in 1.5M $H_2SO_4$ for 16 hr (overnight) and then rinsed in DI water for several times until no $H_2SO_4$ residue was detected.

The membrane conductivity: 0.017 S/cm, Swelling at 80 C, 8M: 120% by area 8M-MeOH Cross-over: $2.4 \times 10^{-7}$ $cm^2/sec$.

Example 7

This example discloses a random copolymer based on 4,4'-Cyclohexylidenebisphenol(BisZ)/Sulfonated Difluorobenzophenone(SBisk)/Difluorobenzophenone(Bisk).

In a 500 ml three necked round flask, equipped with a mechanical stirrer, thermometer, nitrogen inlet and Dean-Stark trap/condenser, 4,4'-cyclohexylidenebisphenol (10.7344 gl), 4,4'-difluorobenzophenone (6.546 g), sulfonated 4,4'-difluorobenzophenone (4.222 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times. The conductivity and water up-take at room temperature are listed in table below.

Example 8

This example discloses a random copolymer based on 4,4'-Cyclohexylidenebisphenol(BisZ)/Sulfonated Difluorobenzophenone(SBisk)/Difluorobenzophenone(Bisk).

In a 500 ml three necked round flask, equipped with a mechanical stirrer, thermometer, nitrogen inlet and Dean-Stark trap/condenser, 4,4'-cyclohexylidenebisphenol (10.7344), 4,4'-difluorobenzophenone (6.3714 g), sulfonated 4,4'-difluorobenzophenone (4.5598 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times. The conductivity and water up-take at room temperature are listed in table below.

Example 9

This example discloses a random copolymer based on 4,4'-Cyclohexylidenebisphenol(BisZ)/Sulfonated Difluorobenzophenone(SBisk)/Difluorobenzophenone(Bisk).

In a 500 ml three necked round flask, equipped with a mechanical stirrer, thermometer, nitrogen inlet and Dean-Stark trap/condenser, 4,4'-cyclohexylidenebisphenol (10.7344 g), 4,4'-difluorobenzophenone (5.6732 g), sulfonated 4,4'-difluorobenzophenone (5.9108 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times. The conductivity and water up-take at room temperature are listed in table below.

| Molar Composition % (BisZ/SBisk/Bisk) | Conductivity S/cm | Swelling % |
|---|---|---|
| Example 7 | 0.005 | 25 |
| Example 8 | 0.007 | 35 |
| Example 9 | 0.017 | 120 |

Example 10

Sulfonated PEEK with 20% Hydroquinone/80% 4,4'-Cyclohexylidenebisphenol

In a 500 ml three necked round flask, equipped with a mechanical stirrer, thermometer, nitrogen inlet and Dean-Stark trap/condenser, hydroquinone (0.8808 g), 4,4'-cyclohexylidenebisphenol (8.5875 g), 4,4'-difluorobenzophenone (5.6732 g), sulfonated 4,4'-difluorobenzophenone (5.9108 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times.

The membrane conductivity: 0.030 S/cm, Swelling at 80 C, 8M: 92% by area 8M-MeOH Cross-over: 5.4×10$^{-7}$ cm$^2$/sec.

Example 11

Sulfonated PEEK with 50% Hydroquinone/50% 4,4'-Cyclohexylidenebisphenol

In a 500 ml three necked round flask, equipped with a mechanical stirrer, thermometer, nitrogen inlet and Dean-Stark trap/condenser, hydroquinone (2.202 g), 4,4'-cyclohexylidenebisphenol (5.3672 g), 4,4'-difluorobenzophenone (5.6732 g), sulfonated 4,4'-difluorobenzophenone (5.9108 g), anhydrous potassium carbonate (7.2 g) were dissolved in a mixture DMSO and toluene (about 20% solid concentration). The mixture was heated to toluene reflux with stirring, keeping the temperature at 150° C. for 4 h, then increasing the temperature to 175-180° C. for 6 h. The reaction mixture was precipitated with acetone or methanol to get the crude product, then washed with hot water four times.

The membrane conductivity: 0.033 S/cm, 8M-MeOH Cross-over: 4.3×10$^{-7}$ cm$^2$/sec.

Example 12

In a 500 mL three necked round flask, equipped with a mechanical stirrer, a thermometer probe connected with a nitrogen inlet, and a Dean-Stark trap/condenser, bis(4-fluorophenyl)sulfone (BisS, 24.79 g, 0.0975 mol), 3,3'-disulfonated-4,4'-difluorobenzophone (SbisK, 22.16 g, 0.0525 mol), BisZ (40.25 g, 0.15 mol), and anhydrous potassium carbonate (26.95 g, 0.19 mol), 270 mL of DMSO and 135 mL of Toluene. The reaction mixture was slowly stirred under a slow nitrogen stream. After heating at ~85° C. for 1 h and at ~120° C. for 1 h, the reaction temperature was raised to ~135° C. for 3 h, and finally to ~170° C. for 2 h. After cooling to ~70° C. with continuing stirring, the viscous solution was dropped into 1 L of cooled methanol with a vigorous stirring. The noodle-like precipitates were cut and washed with di-water four times and dried at 80° C. overnight. The sodium form polymer was exchanged to acid form by washing the polymer in hot sulfuric acid solution (0.5 M) twice (1 h each) and in cold di-water twice. The polymer was then dried at 80° C. overnight and at 80° C. under vacuum for 2 days. This polymer has an inherent viscosity of 0.60 dl/g in DMAc (0.25 g/dl). It's one-day swelling in 8M Methanol at 80° C. was 142%, cross-over in 8 M methanol was 0.009 mg.mil/cc.min.cm$^2$ (boiled), conductivity was 0.013 S/cm (non-boiled) and 0.041 S/cm (boiled).

Example 13

This polymer was synthesized in a similar way as described in example 1, using following compositions: bis(4-fluorophenyl)sulfone (BisS, 22.88 g, 0.090 mol), 3,3'-disulfonated-4,4'-difluorobenzophone (SbisK, 25.34 g, 0.060 mol), BisZ (40.25 g, 0.15 mol), and anhydrous potassium carbonate (26.95 g, 0.19 mol), 270 mL of DMSO and 135 mL of Toluene. This polymer has an inherent viscosity of 0.67 dl/g in DMAc (0.25 g/dl).

Example 14

This polymer was synthesized in a similar way a described in example 1, using the following compositions: BisK (10.69 g, 0.049 mol), 2,6-difluorobenzonitrile (5.86 g, 0.042 mol), 3,3'-disulfonated-4,4'-difluorobenzophone (SBisK, 20.69 g, 0.049 mol), BisZ (37.57 g, 0.14 mol), and anhydrous potassium carbonate (25.15 g, 0.18 mol), 270 mL of DMSO and 135 mL of toluene. This polymer has an inherent viscosity of 0.86 dl/g in DMAc (0.25 g/dl).

Example 15

This polymer was synthesized in a similar way as described in example 1, using following compositions: 4,4'-difluorobenzophone (BisK, 14.18 g, 0.065 mol), 3,3'-disulfonated-4,4'-difluorobenzophone ((SBisK, 14.78 g, 0.035 mol), 9,9-bis(4-hydroxyphenyl)fluorene (35.04 g, 0.10 mol), anhydrous potassium carbonate (17.97 g, 0.13 mol), anhydrous DMSO (180 mL) and freshly distilled toluene (90 mL). This polymer has an inherent viscosity of 0.88 dl/g in DMAc (0.25 g/dl). Its one-day swelling in 8 M methanol at 80° C. was 26%, cross-over in 8 M methanol was 0.013 mg.mil/cc.min.cm$^2$ (non-boiled) and 0.016 mg.mil/cc.min.cm$^2$ (boiled), conductivity was 0.010 S/cm (non-boiled) and 0.019 S/cm (boiled).

Example 16

This polymer was synthesized in a similar way as described in example 1, using following compositions: 4,4'-difluorobenzophone (BisK, 19.64 g, 0.09 mol), 3,3'-disulfonated-4,4'-difluorobenzophone (SBisK, 25.34 g, 0.06 mol), 9,9-bis(4-hydroxyphenyl)fluorene (52.56 g, 0.15 mol), and anhydrous potassium carbonate (26.95 g, 0.19 mol), 270 mL of DMSO and 135 mL of toluene. This polymer has an inherent viscosity of 0.77 dl/g in DMAc (0.25 g/dl). Its one-day swelling in 8 M methanol at 80° C. was 35%, cross-over in 8 M methanol was 0.016 mg.mil/cc.min.cm$^2$ (non-boiled) and 0.016 mg.mil/cc.min.cm$^2$ (boiled), conductivity was 0.015 S/cm (non-boiled) and 0.023 S/cm (boiled).

Example 17

This polymer was synthesized in a similar way as described in example 1, using following compositions: 4,4'-difluorobenzophone (BisK, 18.33 g, 0.084 mol), 3,3'-disulfonated-4,4'-difluorobenzophone (SBisK, 23.65 g, 0.056 mol), 1,1-bis (4-hydroxyphenyl)cyclohexane (BisZ, 18.78 g, 0.070 mol), 9,9-bis (4-hydroxyphenyl)fluorene (FL, 24.53 g, 0.070 mol), and anhydrous potassium carbonate (25.15 g, 0.18 mol), 250 mL of DMSO and 125 mL of toluene. This polymer has an inherent viscosity of 0.97 dl/g in DMAc (0.25 g/dl). Its one-day swelling in 8 M methanol at 80° C. was 54%, cross-over in 8 M methanol was 0.015 mg.mil/cc.min.cm$^2$ (non-boiled) and 0.025 mg.mil/cc.min.cm$^2$ (boiled), conductivity was 0.018 S/cm (non-boiled) and 0.042 S/cm (boiled).

Example 18

This polymer was synthesized in a similar way as described in example 1, using following compositions: 4,4'-difluorobenzophone (BisK, 21.27 g, 0.0975 mol), 3,3'-disulfonated-4,4'-difluorobenzophone (SBisK, 22.17 g, 0.0525 mol), 9,9-bis (4-hydroxyphenyl)fluorene (FL, 26.28 g, 0.075 mol), 4,4'-dihydroxydiphenyl ether (O, 15.16 g, 0.075 mol), and anhydrous potassium carbonate (26.95 g, 0.19 mol), 270 mL of DMSO and 135 mL of toluene. This polymer has an inherent viscosity of 1.21 dl/g in DMAc (0.25 g/dl). Its one-day swelling in 8 M methanol at 80° C. was 50%, cross-over in 8 M methanol was 0.023 mg.mil/cc.min.cm$^2$ (non-boiled), conductivity was 0.030 S/cm (non-boiled) and 0.039 S/cm (boiled).

Example 19

This polymer was synthesized in a similar way as described in example 1, using following compositions: 4,4'-difluorobenzophone (BisK, 21.27 g, 0.0975 mol), 3,3'-disulfonated-4,4'-difluorobenzophone (SBisK, 22.17 g, 0.0525 mol), BisZ (20.12 g, 0.075 mol), 4,4'-dihydroxydiphenyl ether (0, 15.16 g, 0.075 mol), and anhydrous potassium carbonate (26.95 g, 0.19 mol), 270 mL of DMSO and 135 mL of toluene. This polymer has an inherent viscosity of 1.61 dl/g in DMAc (0.25 g/dl). Its one-day swelling in 8 M methanol at 80° C. was 117%, cross-over in 8 M methanol was 0.019 mg.mil/cc.min.cm$^2$ (non-boiled), conductivity was 0.026 S/cm (non-boiled) and 0.057 S/cm (boiled).

Example 20

This polymer was synthesized in a similar way as described in example 1, using following compositions: 4,4'-difluorobenzophone (BisK, 19.64 g, 0.09 mol), 3,3'-disulfonated-4,4'-difluorobenzophone (SBisK, 25.34 g, 0.06 mol), 9,9-bis(4-hydroxyphenyl)fluorene (26.28 g, 0.075 mol), 4,4'-dihydroxydiphenyl ether (15.16 g, 0.075 mol), and anhydrous potassium carbonate (26.95 g, 0.19 mol), 270 mL of DMSO and 135 mL of toluene. This polymer has an inherent viscosity of 1.50 d/lg in DMAc (0.25 g/dl). Its one-day swelling in 8 M methanol at 80° C. was 72%, cross-over in 8 M methanol was 0.023 mg.mil/cc.min.cm$^2$ (non-boiled), conductivity was 0.026 S/cm (non-boiled) and 0.056 S/cm (boiled).

Example 21

This polymer was synthesized in a similar way as described in example 1, using following compositions: 4,4'-difluorobenzophone (BisK, 21.27 g, 0.0975 mol), 3,3'-disulfonated-4,4'-difluorobenzophone (SBisK, 22.17 g, 0.0525 mol), 4,4'-(Hexafluoroisopropylidene)-diphenol (25.21 g, 0.075 mol), 4,4'-hydroxyphenyl ether (15.16 g, 0.075 mol), and anhydrous potassium carbonate (26.95 g, 0.19 mol), 270 mL of DMSO and 135 mL of toluene. This polymer has an inherent viscosity of 1.10 dl/g in DMAc (0.25 g/dl). Its one-day swelling in 8 M methanol at 80° C. was 232%, cross-over in 8 M methanol was 0.020 mg.mil/cc.min.cm$^2$ (non-boiled) and 0.079 mg.mil/cc.min.cm$^2$ (boiled), conductivity was 0.024 S/cm (non-boiled) and 0.061 S/cm (boiled).

Example 22

This polymer was synthesized in a similar way as described in example 1, using following compositions: BisK (17.02 g, 0.078 mol), 3,3'-disulfonated4,4'-difluorobenzophone ((SBisK, 17.73 g, 0.042 mol),2,5-dihydroxy-4'-methylbiphenol (MB, 24.03 g, 0.12 mol), and anhydrous potassium carbonate (21.56 g, 0.156 mol), 216 mL of DMSO and 108 mL of toluene. This polymer has an inherent viscosity of 1.07 dl/g in DMAc (0.25 g/dl).

Example 23

This polymer was synthesized in a similar way as described in example 1, using following compositions: BisK (9.93 g, 0.046 mol), 3,3'-disulfonated-4,4'-difluorobenzophone (SBisK, 10.34 g, 0.024 mol), 4,4'-dihydroxytetraphenylmethane (24.67 g, 0.050 mol), and anhydrous potassium carbonate (12.57 g, 0.091 mol), 126 mL of DMSO and 63 mL of toluene. This polymer has an inherent viscosity of 1.01 dl/g in DMAc (0.25 g/dl).

Example 24

This polymer was synthesized in a similar way as described in example 1, using following compositions: BisK (19.85 g), 3,3'-disulfonated4,4'-difluorobenzophone (SBisK, 16.47), 9,9-bis(4-hydroxyphenyl)fluorene (22.77 g), Bis Z (17.44 g) and anhydrous potassium carbonate (23.36 g), 240 mL of DMSO and 120 mL of toluene. This polymer has an inherent viscosity of 0.74 dl/g in DMAc (0.25 g/dl).

Example 25

This polymer was synthesized in a similar way as described in example 1, using following compositions: BisK (19.85 g), 3,3'-disulfonated-4,4'-difluorobenzophone (SBisK, 16.47), 9,9-bis(4-hydroxyphenyl)fluorene (11.39 g), Bis Z (26.16 g) and anhydrous potassium carbonate (23.36 g), 240 mL of DMSO and 120 mL of toluene. This polymer has an inherent viscosity of 0.63 dl/g in DMAc (0.25 g/dl).

Example 26

This polymer was synthesized in a similar way as described in example 1, using following compositions: BisK (19.85 g), 3,3'-disulfonated4,4'-difluorobenzophone (SBisK, 16.47), 9,9-bis(4-hydroxyphenyl)fluorene (34.16 g), Bis Z (8.72 g) and anhydrous potassium carbonate (23.36 g), 240 mL of DMSO and 120 mL of toluene. This polymer has an inherent viscosity of 1.05 dl/g in DMAc (0.25 g/dl).

Example 27

In a 500 ml three necked round flask, equipped with a mechanical stirrer, thermometer, nitrogen inlet and Dean-Stark trap/condenser, 4,4'-(1,4-phenyldiisopropyldiene) bisphenol (17.30 g), Bis K(7.0915 g), S-Bis K(7.3885 g), , anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 6 h. The reaction mixture precipitates from methanol to get the rude product.

Conductivity: 0.0168S/cm (0.0436 S/cm, boiled), swelling by area in 8M methanol: 67%, 8M methanol cross-over: 0.013 mg/min.ml.mls.

Example 28

In a 500 ml three necked round flask, equipped with a mechanical stirrer, thermometer, nitrogen inlet and Dean-Stark trap/condenser, 4,4'-(1,4-phenyldiisopropyldiene) bisphenol (17.30 g), Bis K(7.637 g), S-Bis K(6.333 g), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 6 h. The reaction mixture precipitates from methanol to get the rude product.

Conductivity: 0.00786S/cm (0.0315 S/cm, boiled), swelling by area in 8M methanol: 41%, 8M methanol cross-over: 0.011 mg/min.ml.mls.

Example 29

This random copolymer was synthesized in a similar way as described in example 1: BisK (14.18 g), S-BisK (14.78 g), BisAF (33.62 g), and anhydrous potassium carbonate (16.59 g) were dissolved in a mixture of DMSO and Toluene (about 20% solid concentration).

This polymer has an inherent viscosity of 1.82 dl/g in DMAc (0.25 g/dl). IEC is 1.23 meq/g. Conductivity: 0.019 S/cm (0.049 S/cm, boiled in water 1 hr), swelling by area in boiled water 1 hr: 27%, water-uptake after boiling the membrane in water 1 hr: 31%

Example 30

This random copolymer was synthesized in a similar way as described in example 1: BisK (13.09 g), S-BisK (16.89 g), BisAF (33.62 g), and anhydrous potassium carbonate (16.59 g) were dissolved in a mixture of DMSO and Toluene (about 20% solid concentration).

This polymer has an inherent viscosity of 1.18 dl/g in DMAc (0.25 g/dl). IEC is 1.38 meq/g. Conductivity: 0.030 S/cm (0.071 S/cm, boiled in water 1 hr), swelling by area in boiled water 1 hr: 47%, water-uptake after boiling the membrane in water 1 hr: 53%

Example 31

This random copolymer was synthesized in a similar way as described in example 1: BisK (12.0 g), S-BisK (19.0 g), BisAF (33.62 g), and anhydrous potassium carbonate (16.59 g) were dissolved in a mixture of DMSO and Toluene (about 20% solid concentration).

This polymer has an inherent viscosity of 1.18 dl/g in DMAc (0.25 g/dl). IEC is 1.38 meq/g. Conductivity: 0.045 S/cm (0.088 S/cm, boiled in water 1 hr), swelling by area in boiled water 1 hr: 73%, water-uptake after boiling the membrane in water 1 hr: 85%

Example 32

This random copolymer was synthesized in a similar way as described in example 1: BisK (13.09 g), S-BisK (16.89 g), biphenol (18.62 g), and anhydrous potassium carbonate (16.59 g) were dissolved in a mixture of DMSO and Toluene (about 20% solid concentration).

IEC is 1.87 meq/g. Conductivity: 0.045 S/cm (0.071 S/cm, boiled in water 1 hr), The membrane became mechanically weak (tears easily) after boiling in water, so swelling and water-uptake data were not obtained properly.

Example 33

This random copolymer was synthesized in a similar way as described in example 1: BisK (12.87 g), S-BisK (17.31 g), biphenol (9.81 g), BisAF (16.81 g), and anhydrous potassium carbonate (16.59 g) were dissolved in a mixture of DMSO and Toluene (about 20% solid concentration).

This polymer has an inherent viscosity of 1.30 dl/g in DMAc (0.25 g/dl). IEC is 1.62 meq/g. Conductivity: 0.045 S/cm (0.090 S/cm, boiled in water 1 hr), swelling by area in boiled water 1 hr: 47%, water-uptake after boiling the membrane in water 1 hr: 65%

Example 34

This random copolymer was synthesized in a similar way as described in example 1: BisK (11.35 g), S-BisK (20.27 g), biphenol (11.17 g), BisAF (13.45 g), and anhydrous potassium carbonate (16.59 g) were dissolved in a mixture of DMSO and Toluene (about 20% solid concentration).

This polymer has an inherent viscosity of 1.29 dl/g in DMAc (0.25 g/dl). IEC is 1.92 meq/g. Conductivity: 0.063 S/cm (0.103 S/cm, boiled in water 1 hr), swelling by area in boiled water 1 hr: 77%, water-uptake after boiling the membrane in water 1 hr: 89%

Example 35

This random copolymer was synthesized in a similar way as described in example 1: BisK (12.87 g), S-BisK (17.31 g), BisFL (7.01 g), BisAF (26.90 g), and anhydrous potassium carbonate (16.59 g) were dissolved in a mixture of DMSO and Toluene (about 20% solid concentration).

This polymer has an inherent viscosity of 1.13 dl/g in DMAc (0.25 g/dl). IEC is 1.41 meq/g. Conductivity: 0.027 S/cm (0.054 S/cm, boiled in water 1 hr), swelling by area in boiled water 1 hr: 33%, water-uptake after boiling the membrane in water 1 hr: 40%

Example 36

This random copolymer was synthesized in a similar way as described in example 1: BisSO$_2$ (15.51 g), S-BisK (16.47 g), BisFL (7.01 g), BisAF (26.90 g), and anhydrous potassium carbonate (16.59 g) were dissolved in a mixture of DMSO and Toluene (about 20% solid concentration).

This polymer has an inherent viscosity of 1.07 dl/g in DMAc (0.25 g/dl). IEC is 1.30 meq/g. Conductivity: 0.018 S/cm (0.048 S/cm, boiled in water 1 hr), swelling by area in boiled water 1 hr: 27%, water-uptake after boiling the membrane in water 1 hr: 29%

Example 37

This random copolymer was synthesized in a similar way as described in example 1: BisK (13.09 g), S-BisK (16.89 g), 4,4'-cyclohexylidenebisphenol (BisZ, 26.84 g), and anhydrous potassium carbonate (16.59 g) were dissolved in a mixture of DMSO and Toluene (about 20% solid concentration).

This polymer has an inherent viscosity of 1.01 dl/g in DMAc (0.25 g/dl). IEC is 1.57 meq/g. Conductivity: 0.038 S/cm (0.064 S/cm, boiled in water 1 hr), swelling by area in boiled water 1 hr: 33%, water-uptake after boiling the membrane in water 1 hr: 45%

Example 38

This random copolymer was synthesized in a similar way as described in example 1: BisK (13.09 g), S-BisK (16.89 g), BisZ (13.42 g), BisAF (16.81 g) and anhydrous potassium carbonate (16.59 g) were dissolved in a mixture of DMSO and Toluene (about 20% solid concentration).

This polymer has an inherent viscosity of 1.14 dl/g in DMAc (0.25 g/dl). IEC is 1.47 meq/g. Conductivity: 0.027 S/cm (0.075 S/cm, boiled in water 1 hr), swelling by area in boiled water 1 hr: 41%, water-uptake after boiling the membrane in water 1 hr: 50%

Example 39

This random copolymer was synthesized in a similar way as described in example 1: BisK (13.09 g), S-BisK (16.89 g), BisZ (5.37 g), BisAF (26.90 g) and anhydrous potassium carbonate (16.59 g) were dissolved in a mixture of DMSO and Toluene (about 20% solid concentration).

This polymer has an inherent viscosity of 1.08 dl/g in DMAc (0.25 g/dl). IEC is 1.42 meq/g. Conductivity: 0.027 S/cm (0.077 S/cm, boiled in water 1 hr), swelling by area in boiled water 1 hr: 44%, water-uptake after boiling the membrane in water 1 hr: 55%

Example 40

In a 100 ml three necked round flask, equipped with a mechanical stirrer, thermometer, nitrogen inlet and Dean-Stark trap/condenser, 4,4'-Thiolbisbenezenethiol (4.5074 g), 4,4'-difluorophenyl sulfone(2.7459 g), sulfonated 4,4'-difluorophenyl sulfone (3.2994 g), anhydrous potassium carbonate (3.3 g) were dissolved in a mixture DMSO and Toluene (about 20% solid concentration). The mixture was heated to toluene flux with stirring, keeping the temperature at 140° C. for 4 h, then increase temperature to 175° C. for 6 h. The reaction mixture was filtered and precipitates from methanol to get the rude product, then washed by hot water four times.

The membrane conductivity: 0.088S/cm, Swelling after boiled: 98% by area, water uptake: 69%.

This formula is that set forth for Formula IIIA where a =0.6 and c =0.4

Example 41

In a 100 ml three necked round flask, equipped with a mechanical stirrer, thermometer, nitrogen inlet and Dean-Stark trap/condenser, 4,4'-Thiolbisbenezenethiol (4.5074 g), 4,4'-difluorophenyl sulfone(2.9747 g), sulfonated 4,4'-difluorophenyl sulfone (2.8874 g), anhydrous potassium carbonate (3.3 g) were dissolved in a mixture DMSO and Toluene (about 20% solid concentration). The mixture was heated to toluene flux with stirring, keeping the temperature at 140° C. for 4 h, then increase temperature to 175° C. for 6 h. The reaction mixture was filtered and precipitates from methanol to get the rude product, then washed by hot water four times.

The membrane conductivity: 0.056S/cm, Swelling after boiled: 46% by area, water uptake: 29%

Example 42

In a 100 ml three necked round flask, equipped with a mechanical stirrer, thermometer, nitrogen inlet and Dean-Stark trap/condenser, 4,4'-Thiolbisbenezenethiol (4.5074 g), 4,4'-difluorophenyl sulfone(3.3599 g), sulfonated 4,4'-difluorophenyl sulfone (3.0933 g), anhydrous potassium carbonate (3.3 g) were dissolved in a mixture DMSO and Toluene (about 20% solid concentration). The mixture was heated to toluene flux with stirring, keeping the temperature at 140° C. for 4 h, then increase temperature to 175° C. for 6 h. The reaction mixture was filtered and precipitates from methanol to get the rude product, then washed by hot water four times.

Example 43

In a 100 ml three necked round flask, equipped with a mechanical stirrer, thermometer, nitrogen inlet and Dean-Stark trap/condenser, 4,4'-Thiolbisbenezenethiol (4.5074 g), 4,4'-difluorophenyl sulfone(2.9747 g), sulfonated 4,4'-difluorophenyl sulfone (1.8306 g), 2,5-Dichlorophenyl sulfone (1.1441 g), anhydrous potassium carbonate (3.3 g) were dissolved in a mixture DMSO and Toluene (about 20% solid concentration). The mixture was heated to toluene flux with stirring, keeping the temperature at 140° C. for 4 h, then increase temperature to 175° C. for 6 h. The reaction mixture was filtered and precipitates from methanol to get the rude product, then washed by hot water four times.

The membrane conductivity: 0.054S/cm, Swelling after boiled: 154% by area, water uptake: 209%

Example 44

In a 100 ml three necked round flask, equipped with a mechanical stirrer, thermometer, nitrogen inlet and Dean-Stark trap/condenser, 4,4'-Thiolbisbenezenethiol (3.3805 g), 2,9-dihydroxyl-fluorene (1.53 g), 4,4'-difluorophenyl sulfone (2.9747 g), sulfonated 4,4'-difluorophenyl sulfone (2.8874 g), anhydrous potassium carbonate (3.3 g) were dissolved in a mixture DMSO and Toluene (about 20% solid concentration). The mixture was heated to toluene flux with stirring, keeping the temperature at 140° C. for 4 h, then increase temperature to 175° C. for 6 h. The reaction mixture was filtered and precipitates from methanol to get the rude product, then washed by hot water four times.

The membrane conductivity: 0.065S/cm, Swelling after boiled: 60% by area, water uptake: 84%

All references cited throughout the specification, including those in the background, are specifically incorporated herein by reference in their entirety.

Although the present invention has been described with reference to preferred embodiments, persons skilled in the art will recognize that changes may be made in form and detail without departing from the spirit and scope of the invention.

What is claimed is:

1. A polymer electrolyte membrane (PEM) comprising a sulfonated copolymer having the formula

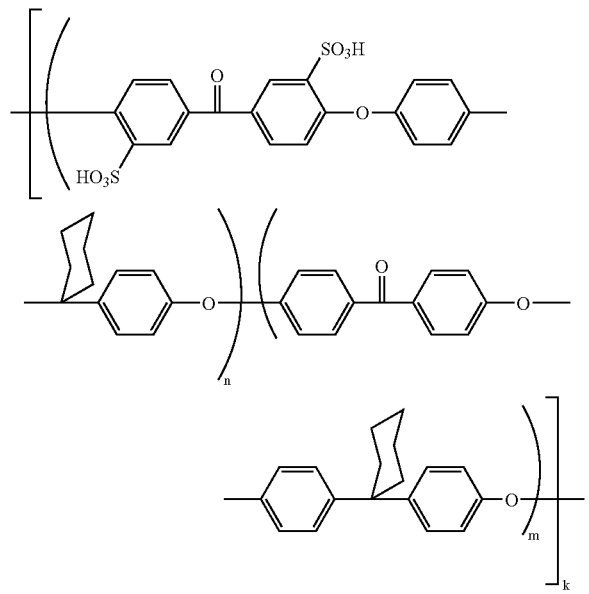

where n and m are mole fractions, n plus m equals 1, n is between 0.1 and 0.5, m is 1 minus n, and k is between 40 and 200 and where said PEM is permeable to protons and has a proton flux greater than 0.005 S/cm.

2. A catalyst coated membrane (CCM) comprising the PEM of claim 1, wherein all or part of at least one of the opposing surfaces of said membrane comprises a catalyst layer.

3. A membrane electrode assembly (MEA) comprising the CCM of claim 2.

4. A fuel cell comprising the MEA of claim 3.

5. An electronic device comprising the fuel cell of claim 4.

6. An electric motor comprising the fuel cell of claim 4.

7. The PEM of claim 1, wherein n=0.3, m=0.7 and k is between 40 and 200.

8. The PEM of claim 1, wherein said proton flux is greater than 0.01 S/cm.

9. The PEM of claim 1, wherein said proton flux is greater than 0.02 S/cm.

10. A membrane electrode assembly (MEA) comprising the PEM of claim 1.

11. A fuel cell comprising the PEM of claim 1.

12. An electronic device comprising the fuel cell of claim 10.

13. An electric motor comprising the fuel cell of claim 10.

14. A residential, commercial or industrial power supply comprising the fuel cell of claim 10.

* * * * *